US008952907B2

(12) United States Patent
Brown et al.

(10) Patent No.: US 8,952,907 B2
(45) Date of Patent: Feb. 10, 2015

(54) TOUCH SCREEN AND METHOD FOR MANUFACTURING A TOUCH SCREEN

(75) Inventors: David P. Brown, Helsinki (FI); Bradley J. Aitchison, Helsinki (FI)

(73) Assignee: Canatu Oy, Helsinki (FI)

( * ) Notice: Subject to any disclaimer, the term of this patent is extended or adjusted under 35 U.S.C. 154(b) by 322 days.

(21) Appl. No.: 13/393,653

(22) PCT Filed: Sep. 2, 2010

(86) PCT No.: PCT/FI2010/050684
§ 371 (c)(1),
(2), (4) Date: May 14, 2012

(87) PCT Pub. No.: WO2011/027034
PCT Pub. Date: Mar. 10, 2011

(65) Prior Publication Data
US 2012/0235951 A1    Sep. 20, 2012

(30) Foreign Application Priority Data

Sep. 4, 2009  (FI) .................................... 20095911

(51) Int. Cl.
G06F 3/041    (2006.01)
G06F 3/044    (2006.01)

(52) U.S. Cl.
CPC .............. G06F 3/0412 (2013.01); G06F 3/044 (2013.01)
USPC .......................................... 345/173; 345/156

(58) Field of Classification Search
USPC ........ 345/156, 173, 174; 178/18.06; 977/742, 977/953
See application file for complete search history.

(56) References Cited

U.S. PATENT DOCUMENTS

| 2002/0167270 | A1* | 11/2002 | Siwinski et al. | ............... 313/506 |
| 2005/0148174 | A1  | 7/2005  | Unger et al. | |
| 2007/0074316 | A1  | 3/2007  | Alden et al. | |
| 2007/0153363 | A1* | 7/2007  | Gruner | .......................... 359/315 |
| 2008/0048996 | A1* | 2/2008  | Hu et al. | ........................ 345/174 |
| 2008/0192014 | A1* | 8/2008  | Kent et al. | ...................... 345/173 |
| 2008/0238882 | A1* | 10/2008 | Sivarajan et al. | ............. 345/174 |

(Continued)

FOREIGN PATENT DOCUMENTS

JP    2002-366303 A    12/2002
JP    2009-505358 A    2/2009

(Continued)

OTHER PUBLICATIONS

International Search Report for corresponding International Patent Application No. PCT/FI2010/050684 mailed Dec. 21, 2010.

(Continued)

*Primary Examiner* — Joe H Cheng
(74) *Attorney, Agent, or Firm* — Merchant & Gould P.C.

(57) ABSTRACT

A touch screen (13) on a display device (1), and a method for manufacturing a touch screen (13) on a display device (1). The display device (1) has an upper substrate (12) for protecting the display device (1) from the environment, the touch screen (13) comprising an electrically conductive transparent first layer (16). The first layer (16) comprises a network of electrically conductive high aspect ratio molecular structures (HARM-structures), the first layer (16) being embedded into the upper substrate (12) of the display device (1) to protect the conductive transparent first layer (16), for reducing the optical thickness of the structure between a viewer and the region of the display device (1) in which the image is formed.

9 Claims, 8 Drawing Sheets

(56) References Cited

U.S. PATENT DOCUMENTS

| | | | |
|---|---|---|---|
| 2008/0283269 A1* | 11/2008 | Graham et al. | 174/98 |
| 2008/0314626 A1 | 12/2008 | Moore | |
| 2008/0316182 A1 | 12/2008 | Antila et al. | |
| 2009/0046073 A1 | 2/2009 | Pennington et al. | |
| 2009/0052029 A1 | 2/2009 | Dai et al. | |
| 2009/0085894 A1 | 4/2009 | Gandhi et al. | |
| 2009/0101488 A1* | 4/2009 | Jiang et al. | 200/512 |
| 2009/0153516 A1* | 6/2009 | Liu et al. | 345/173 |
| 2009/0159188 A1* | 6/2009 | Jiang et al. | 156/235 |
| 2009/0160796 A1* | 6/2009 | Jiang et al. | 345/173 |
| 2009/0160798 A1* | 6/2009 | Jiang et al. | 345/173 |
| 2009/0160799 A1* | 6/2009 | Jiang et al. | 345/173 |
| 2009/0167708 A1* | 7/2009 | Jiang et al. | 345/173 |
| 2009/0167709 A1* | 7/2009 | Jiang et al. | 345/173 |
| 2009/0167711 A1 | 7/2009 | Jiang et al. | |
| 2009/0269560 A1* | 10/2009 | Dhinojwala et al. | 428/206 |
| 2009/0298239 A1* | 12/2009 | Liu et al. | 438/151 |
| 2010/0001975 A1* | 1/2010 | Jiang et al. | 345/173 |
| 2010/0007619 A1* | 1/2010 | Jiang et al. | 345/173 |
| 2010/0045610 A1* | 2/2010 | Hong et al. | 345/173 |
| 2010/0073322 A1* | 3/2010 | Jiang et al. | 345/174 |
| 2010/0075024 A1* | 3/2010 | Ajayan et al. | 427/66 |
| 2010/0136224 A1* | 6/2010 | Britz et al. | 427/122 |

FOREIGN PATENT DOCUMENTS

| | | |
|---|---|---|
| WO | WO 2005/085130 A2 | 9/2005 |
| WO | WO 2007/101906 A1 | 9/2007 |
| WO | WO 2007/101907 A1 | 9/2007 |
| WO | WO 2009/000969 A1 | 12/2008 |
| WO | WO 2010/085686 A1 | 7/2010 |

OTHER PUBLICATIONS

Finnish Search Report for corresponding Finnish Patent Application No. 20095911 mailed Apr. 28, 2010.

Chinese Office Action for corresponding Chinese Patent Application No. 201080048426.4 mailed Apr. 4, 2014 and the English translation.

Japanese Office Action for corresponding Japanese Patent Application No. 2012-527364 mailed May 27, 2014 and the English translation.

* cited by examiner

TOUCH SCREEN AND METHOD FOR MANUFACTURING A TOUCH SCREEN

This application is a National Stage Application of PCT/FI2010/050684, filed 2 Sep. 2010, which claims benefit of Serial No. 20095911, filed 4 Sep. 2009 in Finland and which applications are incorporated herein by reference. To the extent appropriate, a claim of priority is made to each of the above disclosed applications.

FIELD OF THE INVENTION

The present invention relates to sensing technology and display technology. Especially the present invention relates to touch screens on displays, and methods for manufacturing touch screens on displays.

BACKGROUND OF THE INVENTION

Touch screens are emerging as a popular means to interact with an electronic device. Touch screens can be mechanically mated with many different display types, such as cathode ray tubes (CRTs), liquid crystal displays (LCDs), plasma displays, electroluminescent displays, or displays used for electronic paper, such as electrophoretic displays. Many touch screens operate on the principle that when the screen is touched the touch changes an electrical property, such as capacitance or resistance, in a specific location of the touch screen. An electrical signal corresponding to the location of the touch can then be read in a controller unit, to control the operation of a device connected to, for instance, a display. Based on what electrical property is affected by the touch, such touch screens are commonly categorized as e.g. capacitive touch screens or resistive touch screens.

Such touch screens rely on one or more conductive transparent layers, commonly films such as indium tin oxide (ITO) thin-films, as part of an electrical circuit whose capacitance or resistance is modified in a specific location by the touch. The conductive transparent films in known touch screen structures are deposited on a supporting substrate which must be of suitable material to enable a transparent conductive film with good optical and electrical quality to be grown or deposited.

The display devices of the prior art are typically protected by a transparent layer from the viewing side of the display (see e.g. U.S. Pat. No. 5,688,551). These protective transparent layers may be of e.g. glass or of other material, suitable for mechanically and/or chemically protecting the display and/or for supporting a transparent electrode necessary for the operation of the display. As the thin transparent film of the touch screen requires a specific substrate to be deposited on, the touch screen is fabricated as a separate module which is added and aligned on top of the display module, to form a touch display. The separate manufacturing of the touch screen module enables a suitable substrate to be chosen for the transparent conductive film (or several films) of the touch screen.

In addition to the structural support provided by the substrate a conductive transparent film commonly also requires chemical and/or physical protection from one or both sides of the film. This type of encapsulation is required to protect the potentially sensitive transparent conductive film against, for instance, water and/or oxygen or against physical damage (e.g. scratching or bending). Thus the touch screen module adds additional layers through which the image of the display must be viewed.

Due to the added optical thickness of the touch screen module, touch screens, as implemented in touch displays of the prior art, significantly degrade the optical quality/usability of the touch display. This degradation is especially detrimental in touch displays used for e-paper, such as electrophoretic (EPD) displays, which are intended to mimic the appearance of a conventional paper. On displays used for e-paper a touch screen of the prior art destroys one of the key advantages of the display; that the image appears at the surface like in traditional paper and is thus easy and comfortable to view. This disadvantageous effect of conventional touch screen structures causes a particularly unpleasant appearance for the display from wide viewing angles, i.e. when the viewing direction is far away from the direction perpendicular to the plane of the display, and in conditions that would cause high glare and/or reflection in traditional emissive displays such as LCD-displays or OLED-displays. The traditional touch screen module solution, on the other hand, gives the user the sensation of reading the e-paper through a piece of glass which is uncomfortable and unnatural to the user.

Prior art discloses some structures which attempt to integrate the touch screen to a display. E.g. U.S. Pat. No. 5,852,487 discloses a resistive touch screen on a liquid crystal display (LCD), and U.S. Pat. No. 6,177,918 discloses a touch display having the touch screen fabricated on the same side of a common substrate with the display device.

Drawbacks of the structures disclosed in U.S. Pat. No. 5,852,487 include the strict requirements for the common substrate so that the substrate would enable electrode films with suitable optical and electrical properties to be fabricated on both sides of the common substrate. The publication even suggests an approach in which the substrate between the touch screen and the display is formed by laminating separate substrates for the touch screen and the display together, after the touch screen module and the display module have been separately fabricated on their dedicated substrates.

The structures disclosed in U.S. Pat. No. 6,177,918 on the other hand requires a specific arrangement between pixels of the display and the signal generating layer of the touch screen so that the display and the touch screen could be fabricated on the same side of a common substrate. Furthermore, strict material requirements for the substrates of the transparent conductive films still remain in the structures disclosed in this publication.

There exists a need for non-complicated reliable methods and device structures that allow a touch screen to be fabricated on a display such that the optical quality of the image and readability of the display are not compromised by the touch screen.

PURPOSE OF THE INVENTION

A purpose of the present invention is to reduce the aforementioned technical problems of the prior-art by providing a new type of touch screen structure on a display and a new type of method for manufacturing a touch screen structure on a display.

SUMMARY OF THE INVENTION

A product according to the present invention is a touch screen on a display device having an upper substrate for protecting the display device from the environment, the touch screen comprising an electrically conductive transparent first layer. The first layer comprises a network of electrically conductive high aspect ratio molecular structures (HARM-structures), the first layer being embedded into the upper substrate of the display device to protect the conductive transparent first layer, for reducing the optical thickness of the structure between a viewer and the region of the display device in which the image is formed.

A method according to the present invention, for manufacturing a touch screen on a display device having an upper substrate for protecting the display device from the environment, comprises the steps of depositing an electrically conductive transparent first layer comprising a network of electrically conductive high aspect ratio molecular structures (HARM-structures) on the upper substrate of the display device in contact with the upper substrate, and pressing the first layer against the upper substrate, to embed the first layer into the upper substrate, for reducing the optical thickness of the structure between a viewer and the region of the display device in which the image is formed.

In this context the expression "transparent" should be understood as essentially transparent for visible light, preferably transmitting more than 50%, more preferably more than 80% and most preferably more than 90% of visible light. It will however be obvious for a skilled person that "transparent" layers transmitting even less than 50% of visible light can also be used, without departing from the scope of the invention.

Electrically conductive high aspect ratio molecular structures (HARM-structures), e.g. carbon nanotubes (CNTs), carbon nanobuds (CNBs), metal nanowires or carbon nanoribbons, form electrically conductive paths when the HARM-structures are deposited on a substrate. The HARM-structures do not form a film of continuous material, such as e.g. ITO, but rather a network of electrically interconnected molecules. Hence, the properties of the network of HARM-structures are not markedly sensitive to the properties of the substrate, and the substrate material can be relatively freely chosen as long as the substrate can sustain the conditions of the deposition environment. Therefore the network of HARM-structures can be deposited directly on the outer surface of the display device, which in this context is called the upper substrate.

Depositing the first layer on the upper substrate of the display device, such that the first layer resides in contact with the upper substrate, removes the need for using a dedicated substrate for depositing the first layer. This results in an optically thin design for the touch screen on the display, which improves the readability of the display under the touch screen and, therefore, the usability of the touch display. It furthermore simplifies the design and fabrication process of the whole structure as the touch screen can now be directly fabricated on the display device with good electrical and optical quality. Mechanical durability of networks of HARM-structures also results in additional advantages for the end product and enables more reliable manufacturing of the touch display. Moreover, as networks of HARM-structures need not be continuous to be conductive throughout the area of the network, as opposed to e.g. films of metal oxides such as ITO, the deposited networks of HARM-structures can be exceptionally thin while being mechanically and electrically robust. This enables the deposition of very thin networks of HARM-structures with good electrical and mechanical properties for touch screen applications, which increases transparency of the touch screen structure and thereby improves the quality of the image through the touch screen, as experienced by the user.

In one embodiment of the present invention the upper substrate is made of polymer.

In the present invention the first layer is embedded into the upper substrate to protect the conductive transparent first layer.

In yet another embodiment of the present invention the method comprises the step of applying heat to the upper substrate before and/or when pressing the first layer against the upper substrate, to embed the first layer into the upper substrate.

In one embodiment of the present invention the step of pressing the first layer against the upper substrate comprises mechanical compression or thermo-compression. In one embodiment of the present invention the mechanical compression comprises pressing without heating the upper substrate. In one embodiment of the present invention the thermo-compression comprises the use pressing and heating in order to embed the first layer into the upper substrate.

In one embodiment of the present invention the touch screen is a capacitive touch screen. In another embodiment of the present invention the touch screen is a projective capacitive touch screen.

In one embodiment of the present invention the display device is electronic paper. In another embodiment of the present invention the display device is an electrophoretic display.

An additional benefit in some embodiments of the invention is that the first layer, i.e. the network of HARM-structures, can be protected from the environment by embedding the network into the upper substrate of the display device. A network of interconnected HARM-structures is flexible and mechanically durable. This enables embedding the network of HARM-structures into the upper substrate by e.g. thermo-compression. In thermo-compression the upper substrate, which can be of e.g. polymer, is first softened by thermal treatment and subsequently the network of HARM-structures is pressed against the softened upper substrate to transfer the first layer into the upper substrate. When the first layer is encapsulated in the upper substrate in some embodiments of the invention, there is no longer a need to apply additional protective coatings on or under the first layer, which enables touch screen structures with small optical thickness to be fabricated. This further improves the readability and optical quality/usability of the touch display.

In capacitive touch screens it is beneficial, and often necessary, to protect the conductive transparent layer responsible for generating the touch-dependent electrical signal, from both sides of the layer or in a matrix of protective material. Furthermore, when the capacitive touch screen is e.g. of the projective type, the transparent conductive layers are patterned. Patterned layers are especially sensitive to e.g. mechanical or thermal disturbances, which is why their protection is important. Therefore the advantages of the present invention become pronounced in capacitive and projective capacitive touch screens.

Displays which are used for electronic paper applications such as electrophoretic displays attempt to mimic the optical appearance of conventional paper, which is why touch screen modules used on these displays should have as small an optical thickness as possible. Therefore the touch screen structure of the present invention is especially suitable for electrophoretic displays or other displays for electronic paper applications where a small optical thickness for the touch screen structure is desired or even required.

In one embodiment of the present invention the network of high aspect ratio molecular structures (HARM-structures) is a network of carbon nanotubes. In one embodiment of the present invention the network of high aspect ratio molecular structures (HARM-structures) is a network of carbon nanobud molecules having a fullerene molecule covalently bonded to the side of a tubular carbon molecule. Carbon nanotubes (CNTs) and carbon nanobuds (CNBs) are examples of HARM-structures which, when deposited on a substrate, can form a mechanically flexible and durable network which is electrically very conductive even when the deposit is very thin and transparent. Therefore these HARM-structures are well suited for the conductive transparent layers employed in touch screens. Networks of CNTs or CNBs furthermore possess a low refractive index which adds to their potential applicability to touch screens with a small optical thickness. Networks of CNTs or CNBs also exhibit a high charge storage capacity. This additional advantage, with the good electrical conductivity, can be put to use in capacitive and projective capacitive touch screens, to enable shorter response times for registering a touch on the touch screen.

In one embodiment of the invention the touch screen comprises a top substrate layer on the first layer, to protect the first layer from the environment. Under harsh operating conditions where the touch screen becomes exposed to e.g. large temperature variations, a chemically aggressive environment or repeated mechanical stress a top substrate layer may be utilized to provide additional protection for the first layer even when the first layer is embedded into the upper substrate of the display device.

The embodiments of the invention described hereinbefore may be used in any combination with each other. Several of the embodiments may be combined together to form a further embodiment of the invention. A product or a method, to which the invention is related, may comprise at least one of the embodiments of the invention described hereinbefore.

DETAILED DESCRIPTION OF THE INVENTION

In the following, the present invention will be described in more detail with exemplary embodiments by referring to the accompanying figures, in which.

Figure 1:
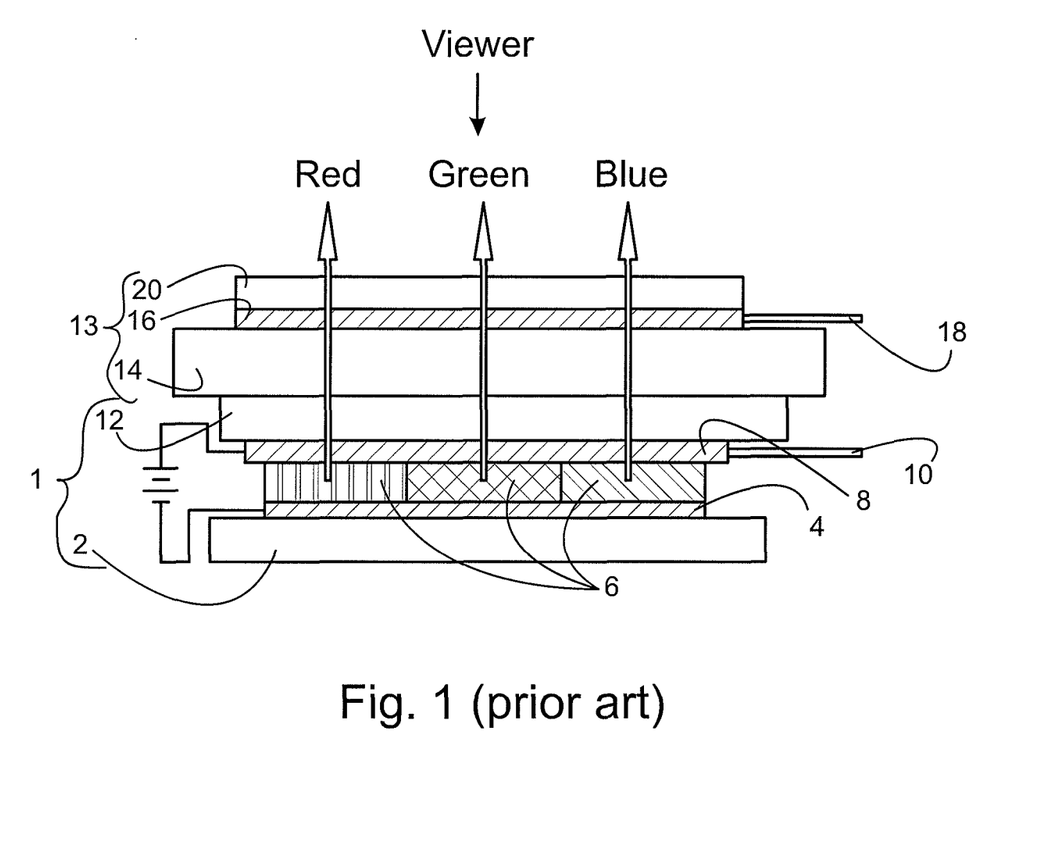
FIG. 1 is a schematic illustration of a touch display of the prior art.

The typical projective capacitive touch display of FIG. 1 comprises a display module 1 and a touch screen module 13 laminated on the display module 1. The display module 1 comprises a backbone 2 providing e.g. driving electronics and a substrate for the display module 1. The display module 1 further comprises first electrodes 4 on the backbone 2, picture elements 6 for generating the image of the display module 1, second electrodes 8 which are transparent, on the picture elements 6, an electrical power source connected to the picture elements 6, and a first control cable 10 to feed the image control signal to the second electrodes 8 to selectively activate picture elements 6. The second electrodes 8, which may comprise a network of HARMs, and/or a transparent conductive film, are covered with a protective upper substrate 12, which can be of e.g. glass or polymer.

The typical projective capacitive touch screen module 13 of FIG. 1 comprises two transparent substrates 14, 20 (e.g. glass) which are laminated together, each substrate 14, 20 having a patterned transparent conductive coating which together form a conductive transparent first layer 16 in between the two transparent substrates 14, 20. This first layer 16 is the touch-sensitive element of the touch screen module 13 and is connected to a control unit (not shown) via a second control cable 18.

Sensitivity of the first layer 16 to a touch on the surface of the top substrate layer 20 is achieved by the patterned conductive coatings (electrodes) of the touch sensitive first layer 16. These patterned coatings are fabricated from a thin film by patterning conductive transparent material such as e.g. ITO (indium tin oxide), FTO (fluorine tin oxide) or ATO (antimony tin oxide). Conductive traces (e.g. silver, copper or gold) are typically used to couple the patterned ITO, FTO or ATO film to the control unit via the second control cable 18. The underside of the top substrate layer 20 may e.g. have horizontal Y-measuring electrodes while the top surface of the bottom substrate 14 has vertical X-measuring electrodes. The X- and the Y-electrodes together form the first layer 16. The Y-measuring electrodes can be patterned e.g. in such a way as to minimize shielding of the X-electrodes from a touching element (e.g. a tip of a finger) which touches the touch screen module 13 on the surface of the top substrate layer 20. Thus, in this configuration, the X and Y-electrodes are contained within the same plane. Various ways of patterning the electrodes in the touch sensitive first layer 16 are known from the prior art. In the projective capacitive touch screen of FIG. 1, when a conductive surface, such as the tip of a finger, is brought close to, or in contact with, the top substrate layer 20, a position-dependent perturbation in the capacitances of an RC-circuit comprising the X- and Y-electrodes is registered, and an electrical signal corresponding to the location of the touch is conveyed to the control unit (not shown) via the second control cable 18.

Conventionally, when a touch screen is used on a display, the touch screen module 13 is placed over the display module 1, above the upper substrate 12 through which light is emitted, and the two modules 1, 13 are held together by a mechanical mounting means (e.g. by a frame-like construction). The display module 1 in FIG. 1 can be e.g. an LCD, a plasma display, an OLED display, an electrophoretic display, or any other display which is capable of supporting and interacting with a touch screen. The backbone 2 of the display module 1 then comprises the necessary components to drive the specific display type, e.g. power converters, backlight sources and supporting structures.

The thickness and materials in the substrates 12, 14, 20 and the first layer 16 can degrade the quality of the image as it passes through the structure towards the viewer. When light passes from the underlying picture elements 6 through the touch screen module 13, the light experiences changes in the refractive index. Some light is absorbed, some light is refracted, some light is transmitted, and some light is reflected. This degrades readability, brightness, sharpness and other optical properties of the image as generated by the picture elements 6, in the touch display of the prior art presented in FIG. 1.

For reasons of simplicity, item numbers will be maintained in the following exemplary embodiments in the case of repeating components.

Figure 2:
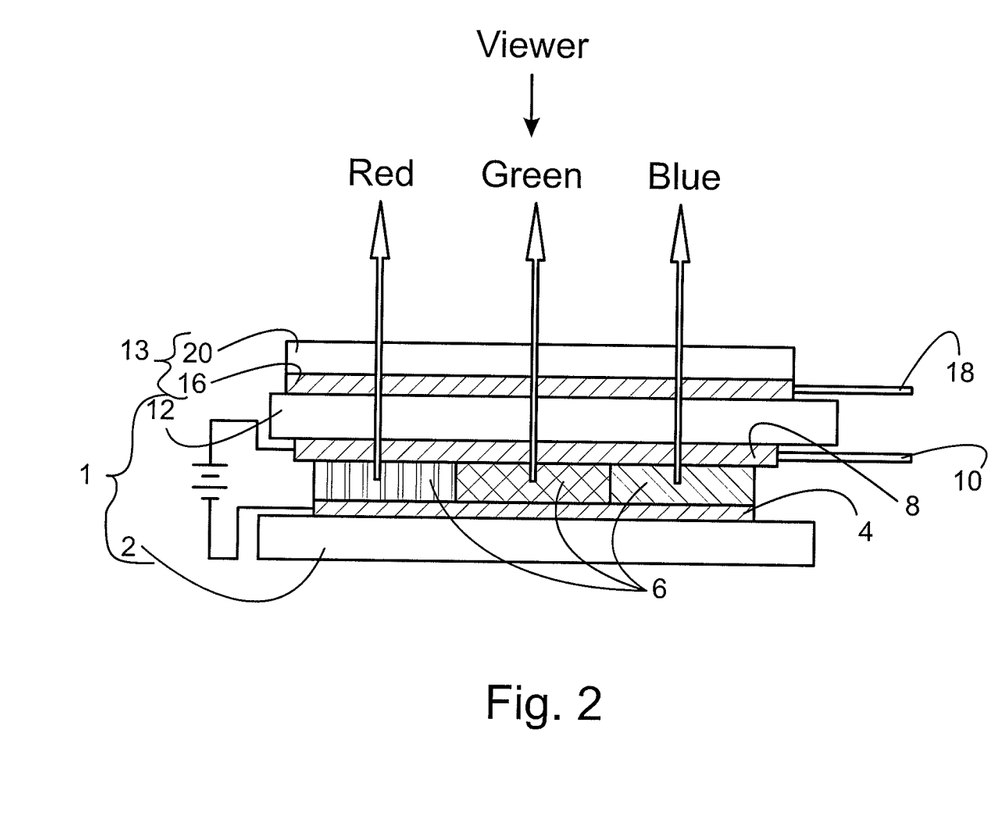
FIG. 2 is a schematic illustration of a touch screen on a display, according to one embodiment of the invention.

FIG. 2 presents a touch display according to one embodiment of the invention, where the touch sensitive first layer 16 is a network of HARM-structures, e.g. CNTs, nanowires, nanoribbons or CNBs, which has been patterned to incorporate the X- and the Y-electrodes. As discussed, the HARM-structures, such as CNTs or CNBs, do not grow as a film of material on a substrate, but rather as a network of molecules, and hence do not impose specific limitations on the substrate material onto which the network is deposited or on the thickness of the network of HARM-structures. Therefore the first layer 16 can be deposited directly onto the upper substrate 12 of the display module 1 to the desired layer thickness, which results in a small optical thickness for the touch screen structure. This is contrary to the touch screen structures of the prior art where the ITO, FTO or ATO films, deposited by e.g. common thin-film deposition methods such as CVD, PVD or ALD, must be grown on a substrate of specific material so that the films have good optical and electrical quality.

The thin touch screen module 13 of FIG. 2 is less visible to the user and thus enhances the performance of the display/touch screen combination. Networks of CNTs and CNBs furthermore have a low index of refraction, which adds to the advantageous reduction in the optical thickness of the touch screen module 13.

The touch display of FIG. 2 according to one embodiment of the invention can be fabricated by depositing and patterning the first electrodes 4 on the backbone 2 of an electrophoretic display (EPD). This can be done by conventional thin-film deposition and lithographic methods. Next, a liquid polymer layer containing e-ink capsules is deposited on the first electrodes to form the picture elements 6 and transparent second electrodes 8 are formed on the picture elements 6. The first 4 and the second 8 electrodes are connected to an electrical power source which generates an electric field between the electrodes. The electric field over each individual picture element is controlled by the first control cable 10, which is attached to the control unit (not shown) controlling the voltage of each individual second electrode 8. A protective upper substrate 12 made of polymer is assembled on the second electrodes 8. The touch sensitive first layer 16 of the touch screen module 13 can be deposited directly and patterned on the upper substrate 12 at many alternative stages of the process flow. The first layer 16 can be e.g. deposited before or after the upper substrate 12 is assembled to the display module 1. Correspondingly, the top substrate layer 20 can be assembled on the first layer 16 before or after the upper substrate 12 is assembled to the display module 1. In another embodiment of the invention the first layer 16 can also be deposited on the top substrate layer 20 first, and subsequently the first layer 16 residing on the substrate layer 20 can be deposited in contact with the upper substrate 12 which is already assembled onto the display module 1. The top substrate layer 20 is used to mechanically support the underlying structure and to protect the first layer 16 e.g. mechanically and chemically from the environment.

Details of a gas-phase synthesis process for HARM-structures and a process which can be used to deposit a network of CNTs (or CNBs) on a substrate are disclosed in e.g. patent application publications WO2005/085130, WO2007/101906 and WO2007/101907 which are included as references herein. Details of a patterning process to pattern a network of HARM-structures are disclosed in patent application publication WO2009/000969 which is included as a reference herein.

According to some embodiments of the present invention the processes disclosed in the references above can be employed to fabricate the patterned X-electrodes and the Y-electrodes comprising the HARM-structures in the first layer 16. Electrical connection of the second control cable 18 to the HARM-structures of the first layer 16 (formed of e.g. CNTs or CNBs) can be accomplished with methods known from the prior art and these methods are obvious for a skilled person. Such methods are discussed in e.g. patent application publication US2005/0148174, which is included as a reference herein.

As an example of how to deposit the network of HARM-structures on the upper substrate 12 according to one embodiment of the invention, SWCNTs (single walled carbon nanotubes) were synthesized in an aerosol laminar flow (floating catalyst) reactor using carbon monoxide and ferrocene as a carbon source and a catalyst precursor, respectively. SWCNT mats were then collected directly from the gas phase downstream of the reactor by filtering through a 2.45 cm diameter nitrocellulose (or silver) disk filters (Millipore Corp, USA). The filter, in this embodiment, takes the role of a preliminary substrate. The deposition temperature on the filter surface (preliminary substrate) was measured to be 45° C. The layer thickness of SWCNT networks formed on the preliminary substrate was controlled by the deposition time, which could be altered from a few minutes to several hours depending on the desired network thickness. In this way, networks of SWCNTs of different thicknesses were obtained on the preliminary substrate, and measurement results showed that the deposits were randomly oriented networks of SWCNTs. Subsequently, in this embodiment of the invention, physical compression and heating (thermo-compression) was used to transfer the SWCNT networks from the preliminary substrate onto the upper substrate 12. Thermo-compression was carried out by applying a force between two parallel heated plates between which the preliminary substrate and the upper substrate 12 were placed, such that the network of SWCNTs was sandwiched in between the preliminary substrate and the upper substrate 12. The heated compression plates naturally also caused heating of the preliminary substrate, the SWCNT-network, and upper substrate 12.

As an example, SWCNT networks were transferred to 10 µm thick medium-density polyethylene (PE) polymer films (MetsäTissue Ltd, Finland), which served the purpose of the upper substrate 12. This material is flexible, optically essentially transparent, has a melting temperature $t_m$ of about 125° C. and a glass transition temperature $t_g$ of about −125° C. After thermo-compression, the preliminary substrate was removed from contact with the SWCNT-network. Finally, the transferred network of SWCNTs was densified on the upper substrate 12 by an intercalation material (ethanol or water), to form the first layer 16.

To evaluate optical transparency of the SWCNT networks, an uncoated polymer film was used as a reference. The transparency of the SWCNT networks deposited onto the polymer film varied from approximately 60% to 95% for a CNT network having a thickness ranging from 500 to 24 nm, respectively.

Figure 3:
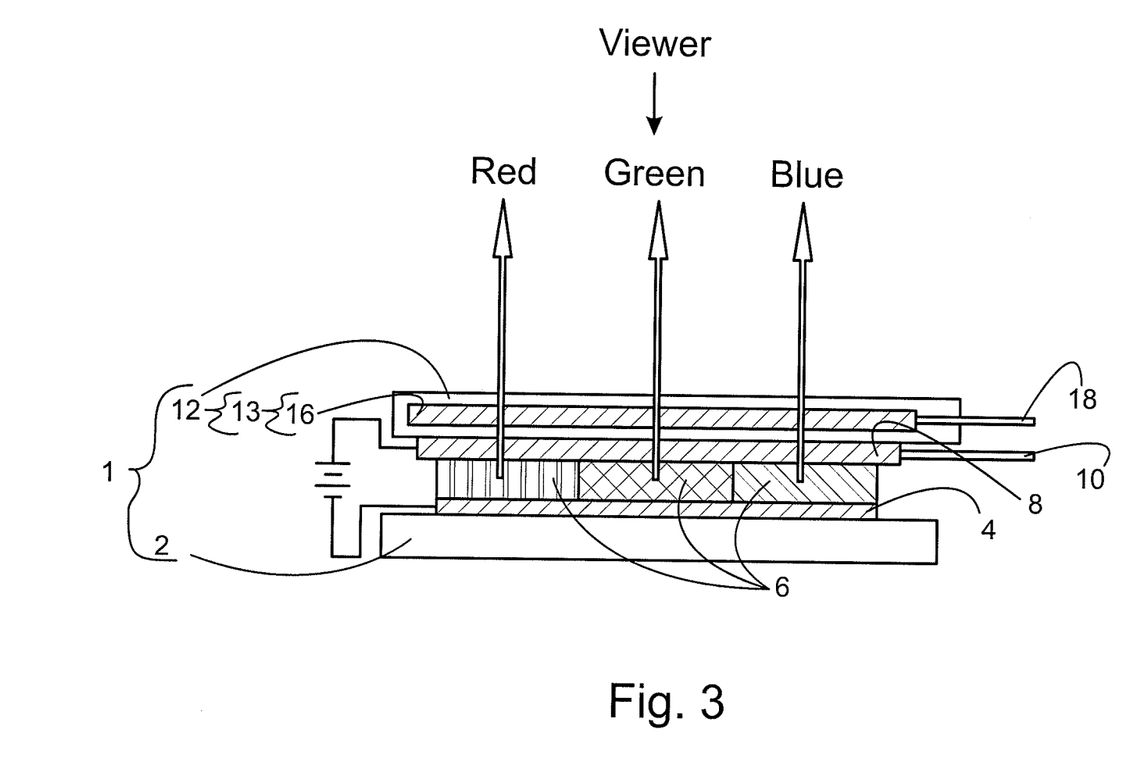
FIG. 3 is a schematic illustration of a touch screen on a display, according to another embodiment of the invention.
Figure 4:
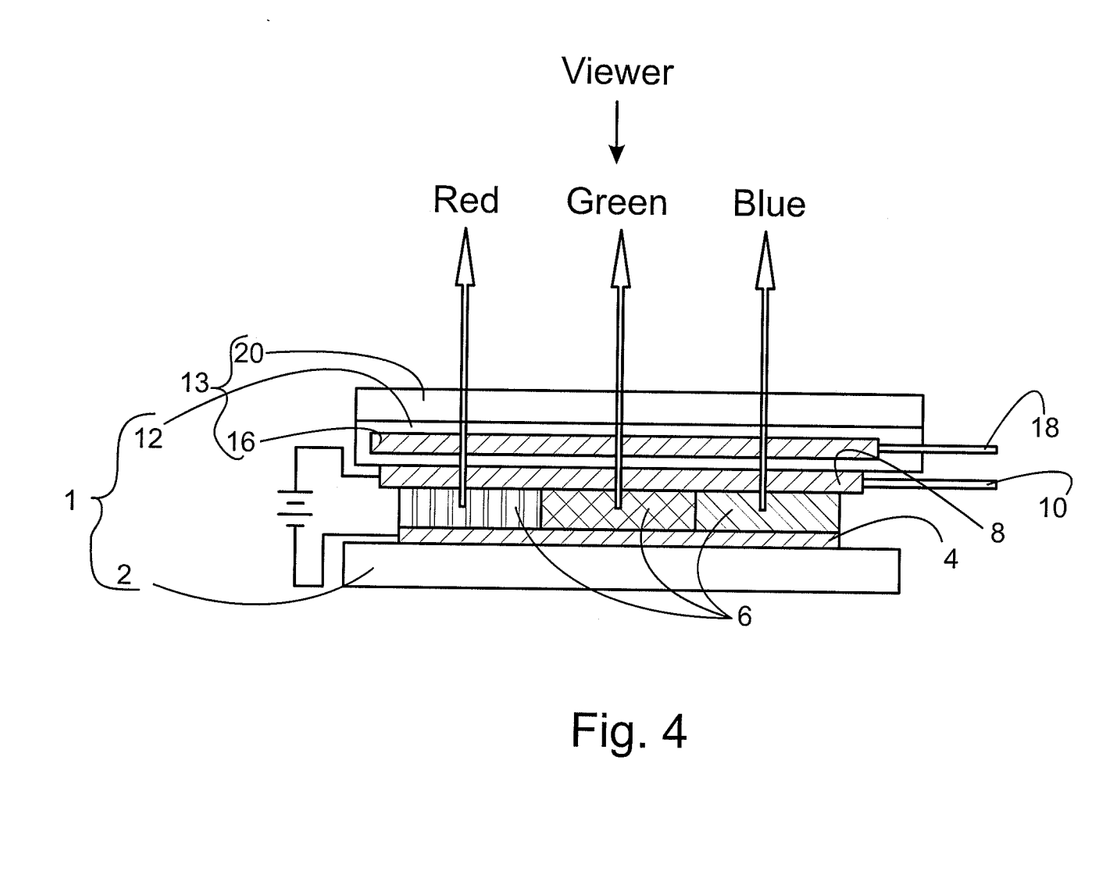
FIG. 4 is a schematic illustration of a touch screen on a display, according to yet another embodiment of the invention.

In the embodiment of the invention presented in FIG. 3 the touch sensitive first layer 16 is embedded into an upper substrate 12 (made of polymer) of the display module 1. Embedding the first layer 16 diminishes the need to have an additional protective top substrate layer 20 or a separate encapsulation layer to protect the touch sensitive first layer 16, as the touch sensitive electrodes of the first layer 16 are protected and encapsulated in this embodiment of the invention by the upper substrate 12. This structure results in a further decrease in the optical thickness of the touch screen and thereby improves the readability and usability of the touch display. Although the first layer 16 is well protected by the upper substrate 12 into which the first layer 16 is embedded, under harsh operating condition there may still exist a need for additional protection. Where the touch screen becomes exposed to e.g. large temperature variations, a chemically aggressive environment or repeated mechanical stress, a top substrate layer 20 may be deposited on the first layer 16 to provide additional protection for the first layer 16. This embodiment of the invention is presented schematically in FIG. 4. The embedded structure of FIG. 3 or FIG. 4 is difficult to achieve with transparent conductive materials other than a network of HARM-structures in the touch sensitive first layer 16. Examples of these other materials include conductive polymers and the films of metal oxides mentioned above.

The first layer 16 comprising the network of HARM-structures, e.g. CNTs or CNBs, can be embedded directly into the upper substrate 12 of the EPD display module (or any other suitable display module) by e.g. thermo-compression. The details of a thermo-compression method were discussed above and can also be found in patent application publication WO2009/000969 which is included as a reference herein.

Figure 5:
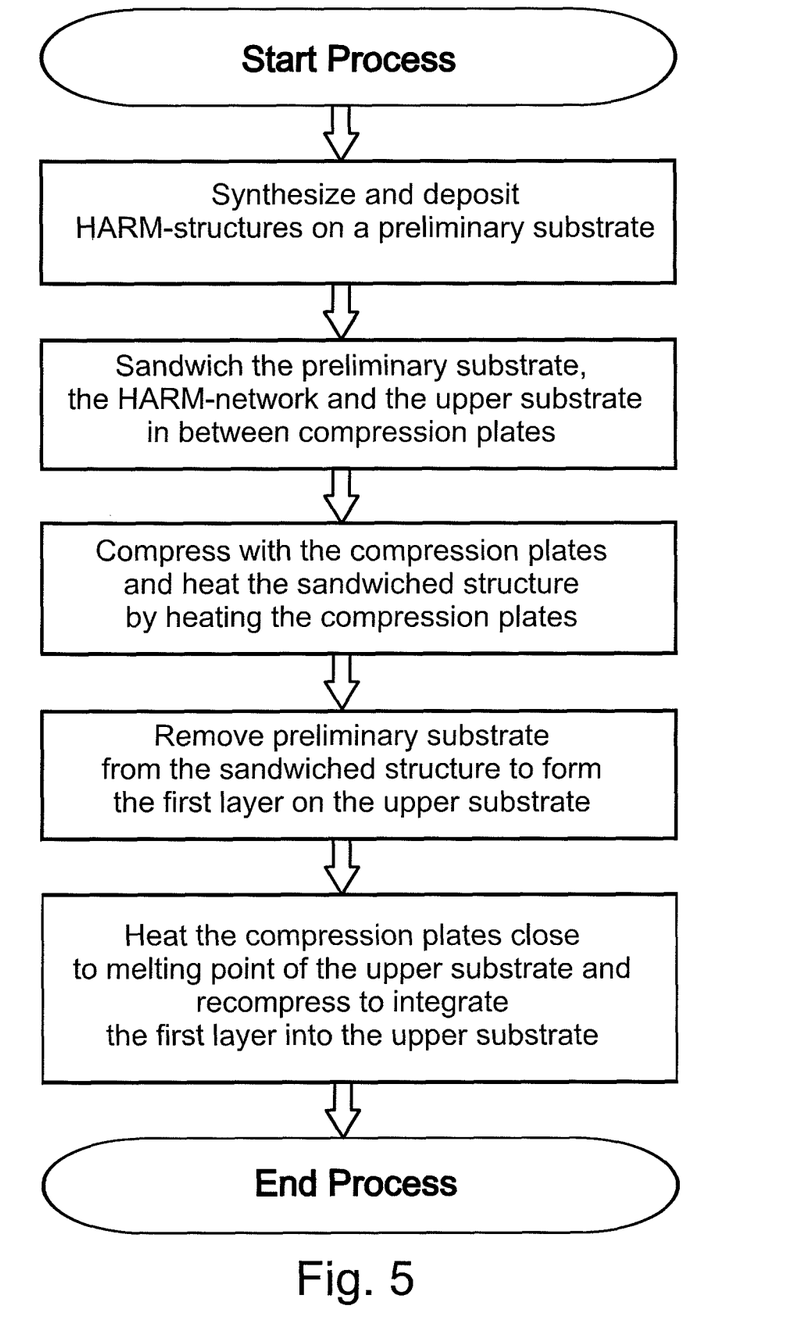
FIG. 5 is a flow-chart illustration of a method to integrate the first layer into the upper substrate according to one embodiment of the invention.

To enable the integration of the first layer 16 into the upper substrate 12 according to FIG. 3 or FIG. 4 the first layer 16 is first deposited onto the upper substrate 12 from the preliminary substrate e.g. as discussed above. After removal of the preliminary substrate from contact with the first layer 16, thermo-compression is used again to press the first layer 16 residing on the upper substrate 12 into the upper substrate 12. This time the temperature of the compression plates discussed above is increased close to the melting temperature of the material of the upper substrate 12. This will cause the viscosity of the upper substrate to decrease and the applied compression force will press the first layer 16 into the upper substrate 12 to integrate the first layer 16 into the polymer material of the upper substrate 12, i.e. into a polymer matrix. Details of the process parameters needed to realize the integration are interrelated and they will depend on e.g. the composition of the upper substrate 12. Suitable process parameters can be readily found by the skilled professional in light of this specification. A method to integrate the first layer 16 into the upper substrate 12 according to one embodiment of the invention is presented as a flow-chart in FIG. 5.

In one embodiment of the present invention the first layer 16 is embedded into the upper substrate 12 by mechanical compression. In this embodiment the first layer 16 deposited on the upper substrate 12 is pressed against the upper substrate without the use of heat to embed the first layer 16 into the upper substrate 12.

Figure 6:
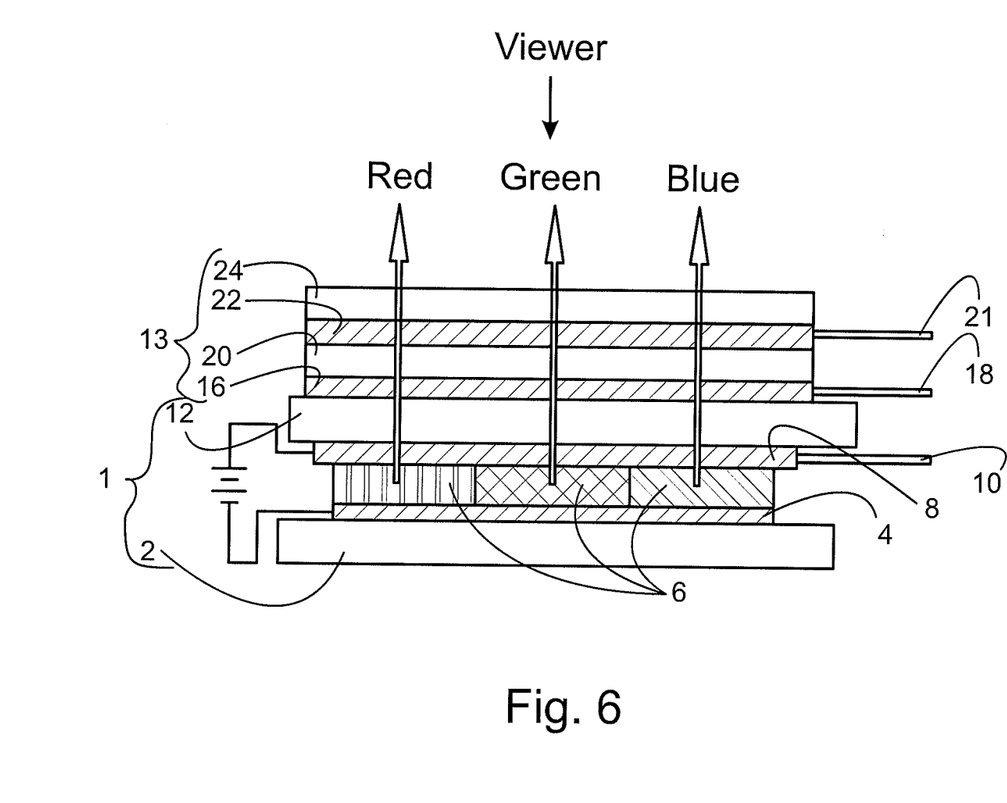
FIG. 6 is a schematic illustration of a touch screen on a display, according to another embodiment of the invention.

The touch sensitive display structure schematically illustrated in FIG. 6 according to yet another embodiment of the invention comprises an electrically conductive transparent second layer 22 on the top substrate layer 20. The second layer 22 like the first layer 16 is a network of HARM-structures. The structure also comprises an optional top coating 24 on the second layer 22 to protect the second layer 22 from the environment. The structure of FIG. 6 can be fabricated as disclosed above and by fabricating the transparent electrically conductive layers comprising a network of HARM-structures, i.e. the first layer 16 and the second layer 22, on each side of the transparent top substrate layer 20. The "two-layer" touch screen module 13 of FIG. 6, comprising the first layer 16 on one side of the top substrate layer 20; the second layer 22 on the other side of the top substrate layer 20; optionally the top coating 24 on the second layer 22; and the top substrate layer 20 in between the first layer 16 and the second layer 22, can then be assembled on the upper substrate 12 of the display module 1 such that the first layer 16 is deposited in contact with the upper substrate 12. The transparent protective coating 24, which can be of e.g. PET or other polymer, can be deposited on the second layer 22 before or after the aforementioned touch screen module 13 is assembled onto the upper substrate 12.

The additional electrically conductive transparent second layer 22 in FIG. 6 comprises X- and Y-electrodes, like in the first layer 16, which are electrically connected to a control unit (not shown) via a third control cable 21. The electrodes in the first layer 16 are capacitively coupled with the electrodes in the second layer 22, and when the touch screen module 13 is touched on (or brought close to) the exposed surface, the touching conductive surface, e.g. the tip of a finger, is capacitively coupled to the electrodes of the second layer 22. Hence, two capacitive couplings are formed in series, the third electrode being a touching conductive surface. As known by the skilled person a series connection of capacitors, such as the one in the touch screen module 13 of FIG. 6, can be used to improve the accuracy and sensitivity of the touch screen module 13.

Figure 7:
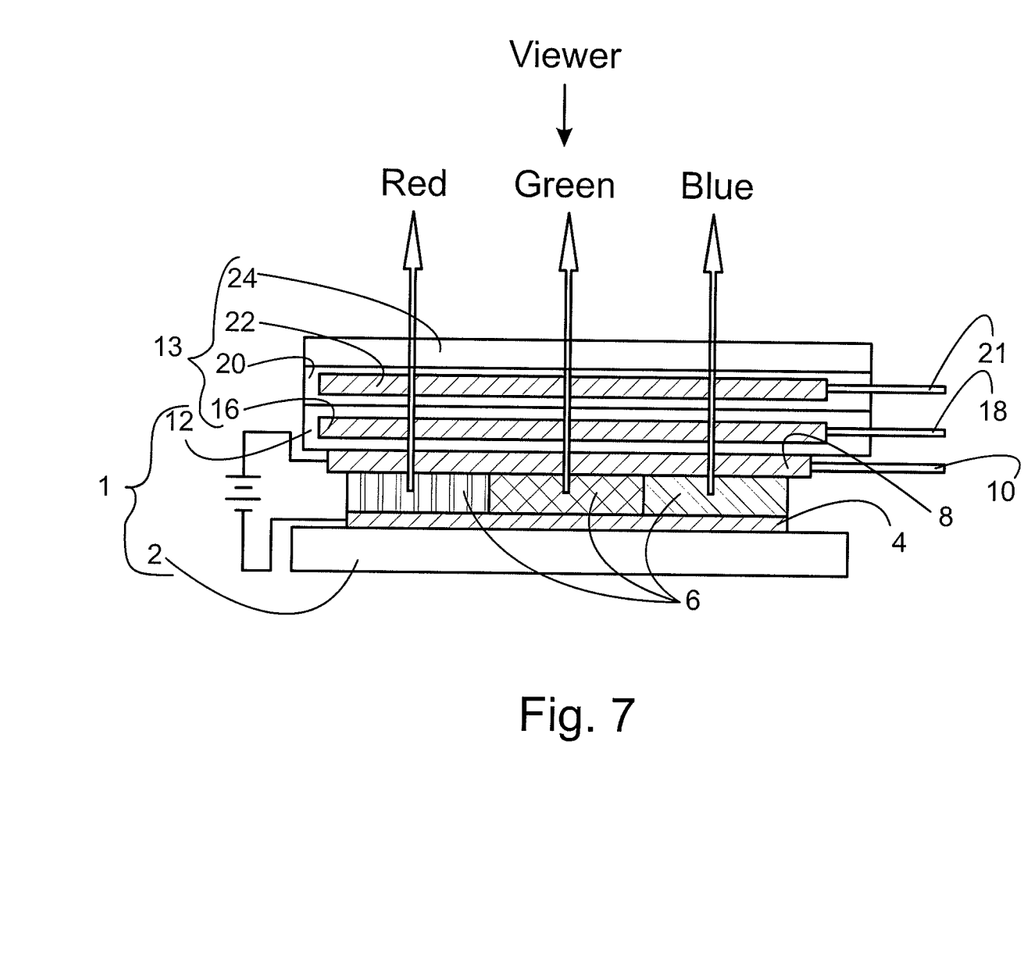
FIG. 7 is a schematic illustration of a touch screen on a display, according to yet another embodiment of the invention.

In another embodiment of the invention illustrated schematically in FIG. 7 the first layer 16 is embedded into the upper substrate 12 of the display module 1 and the second layer 22 is embedded into the top substrate layer 20. The embedding of the first 16 and the second 22 layer can be achieved by e.g. the thermo-compression method disclosed above, and this will be obvious for a skilled person in light of this specification. The touch screen module 13 of FIG. 7 also comprises the optional transparent protective coating 24.

Figure 8:
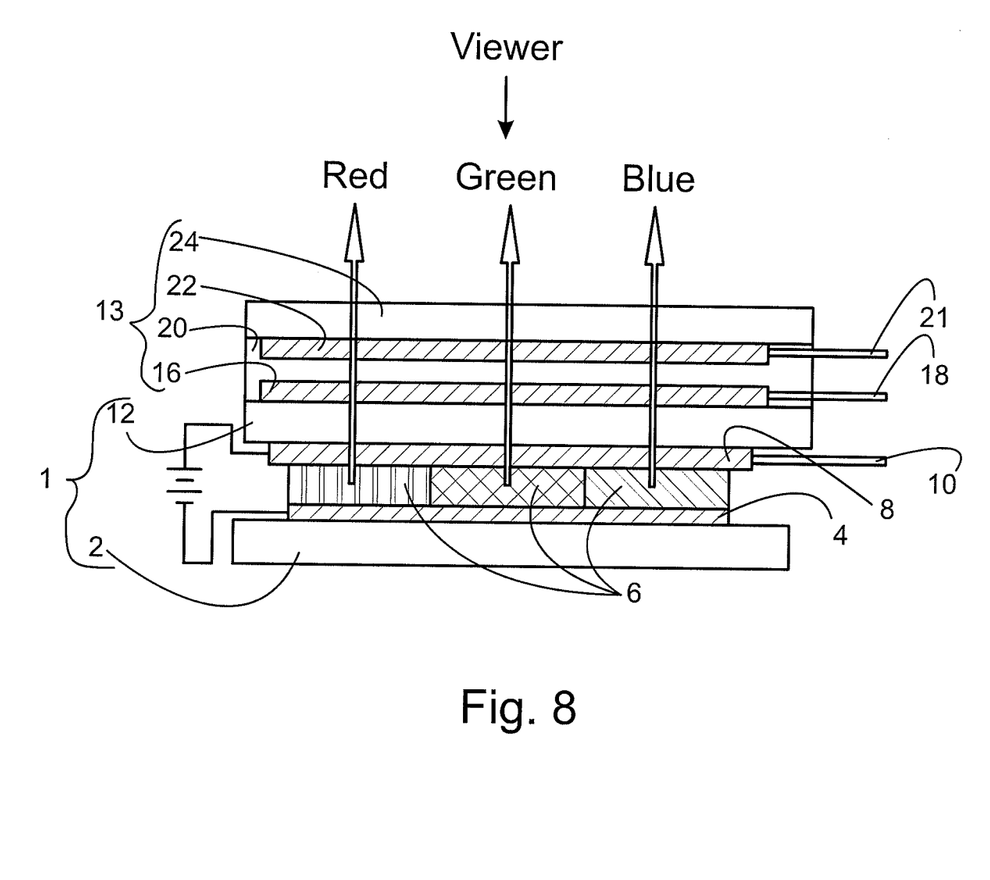
FIG. 8 is a schematic illustration of a touch screen on a display, according to yet another embodiment of the invention.

Another embodiment of the invention, illustrated schematically in FIG. 8, presents how the first layer 16 and the second layer 22 can be both embedded in the top substrate layer 20, while the first layer 16 retains contact with the upper substrate 12 as it is not completely surrounded by the material of the top substrate layer 20. The second layer 22 is also not completely surrounded by the material of the top substrate layer 20, but remains exposed to the environment or, in case the protective coating 24 is employed, in contact with the protective coating 24. In the embodiment of FIG. 8 the embedding of the first 16 and the second 22 layer can be achieved by e.g. the thermo-compression method disclosed above, and this method will be obvious for a skilled person in light of this specification.

As is obvious for a skilled person, other ways of embedding the first 16 and the second 22 layer into the upper substrate 12 and/or the top substrate layer 20 may also be conceived, and features of the different embodiments of the invention discussed above can be combined in light of this specification to form another embodiment of the invention.

Although the examples above describe the invention in the context of a projective capacitive touch screen, the same inventive idea can be used in other types of touch screen structures as well; e.g. in resistive touch screens and in non-projective, "regular", capacitive touch screens. The modifications required for the invention to be utilized in these touch screen structures will be obvious for a skilled person in light of this disclosure of the invention. Also other deposition methods to deposit or pattern the first layer 16 and/or the second layer 22 comprising HARM-structures can be conceived by the skilled professional in light of this specification.

As is clear for a person skilled in the art, the invention is not limited to the examples described above but the embodiments can freely vary within the scope of the claims.

The invention claimed is:

1. A touch screen on a display device having an upper substrate, the touch screen comprising an electrically conductive transparent first layer, wherein the electrically conductive transparent first layer comprises a network of electrically conductive high aspect ratio molecular structures (HARM-structures), the electrically conductive transparent first layer being embedded into the upper substrate of the display device.

2. The touch screen of claim 1, wherein the upper substrate is made of polymer.

3. The touch screen of claim 1, wherein the touch screen is a capacitive touch screen.

4. The touch screen of claim 1, wherein the touch screen is a projective capacitive touch screen.

5. The touch screen of claim 1, wherein the display device is electronic paper.

6. The touch screen of claim 1, wherein the display device is an electrophoretic display.

7. The touch screen of claim 1, wherein the network of high aspect ratio molecular structures (HARM-structures) is a network of carbon nanotubes.

8. The touch screen of claim 1, wherein the network of high aspect ratio molecular structures (HARM-structures) is a network of carbon nanobud molecules having a fullerene molecule covalently bonded to the side of a tubular carbon molecule.

9. The touch screen of claim 1, wherein the touch screen comprises a top substrate layer on the electrically conductive transparent first layer, to protect the electrically conductive transparent first layer from environment.

\* \* \* \* \*